US012795237B2

(12) United States Patent
Abe et al.

(10) Patent No.: US 12,795,237 B2
(45) Date of Patent: Nov. 10, 2026

(54) IMAGE STABILIZATION DEVICE AND IMAGING APPARATUS

(71) Applicant: FUJIFILM Corporation, Tokyo (JP)

(72) Inventors: Takuro Abe, Saitama (JP); Shuhei Matsushita, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 19/070,430

(22) Filed: Mar. 4, 2025

(65) Prior Publication Data

US 2025/0203206 A1 Jun. 19, 2025

Related U.S. Application Data

(63) Continuation of application No. PCT/JP2023/026356, filed on Jul. 19, 2023.

(30) Foreign Application Priority Data

Sep. 6, 2022 (JP) ................................ 2022-141308

(51) Int. Cl.
*H04N 23/68* (2023.01)
*H04N 23/57* (2023.01)

(52) U.S. Cl.
CPC ........... *H04N 23/685* (2023.01); *H04N 23/57* (2023.01)

(58) Field of Classification Search
CPC .......... G03B 5/00; H04N 23/57; H04N 23/68; H04N 23/685
See application file for complete search history.

(56) References Cited

U.S. PATENT DOCUMENTS 12,470,823 B2 * 11/2025 Matsushita .......... H04N 23/687
2017/0155846 A1 6/2017 Ezawa et al.
(Continued)

FOREIGN PATENT DOCUMENTS

JP H1164916 3/1999
JP 2015007731 1/2015
(Continued)

OTHER PUBLICATIONS

"International Search Report (Form PCT/ISA/210) of PCT/JP2023/026356," mailed on Sep. 19, 2023, with English translation thereof, pp. 1-5.
(Continued)

*Primary Examiner* — Antoinette T Spinks
(74) *Attorney, Agent, or Firm* — JCIPRNET

(57) ABSTRACT

Provided are an image stabilization device and an imaging apparatus in which an influence of other magnetic materials on a ball receiving surface is suppressed. An image stabilization device includes: a movable unit that has an imaging element and a plurality of coils and is supported to be movable in a plane parallel to an imaging surface of the imaging element; a fixed unit that supports the movable unit and has a plurality of magnets, which are disposed to face the plurality of coils, and a yoke; and a ball that is disposed between the movable unit and the fixed unit, in which the movable unit has a ball housing portion configured with a hollow protruding portion that houses the ball, and a ball receiving surface provided at a bottom portion of the ball housing portion is formed of a non-magnetic metal material.

12 Claims, 15 Drawing Sheets

(56) References Cited

U.S. PATENT DOCUMENTS

| | | | | |
|---|---|---|---|---|
| 2020/0073201 | A1 | 3/2020 | Noguchi et al. | |
| 2024/0292103 | A1* | 8/2024 | Matsushita .......... | H04N 23/687 |
| 2026/0025586 | A1* | 1/2026 | Matsushita .......... | H04N 23/687 |

FOREIGN PATENT DOCUMENTS

| | | |
|---|---|---|
| JP | 2016131265 | 7/2016 |
| JP | 2017097298 | 6/2017 |
| JP | 2019200349 | 11/2019 |
| JP | 2020038294 | 3/2020 |
| WO | 2021149339 | 7/2021 |

OTHER PUBLICATIONS

"Written Opinion of the International Searching Authority (Form PCT/ISA/237) of PCT/ JP2023/026356," mailed on Sep. 19, 2023, with English translation thereof, pp. 1-8.

* cited by examiner

IMAGE STABILIZATION DEVICE AND IMAGING APPARATUS

CROSS-REFERENCE TO RELATED APPLICATIONS

The present application is a Continuation of PCT International Application No. PCT/JP2023/026356 filed on Jul. 19, 2023 claiming priority under 35 U.S.C § 119 (a) to Japanese Patent Application No. 2022-141308 filed on Sep. 6, 2022. Each of the above applications is hereby expressly incorporated by reference, in its entirety, into the present application.

BACKGROUND OF THE INVENTION

1. Field of the Invention

The present invention relates to an image stabilization device and an imaging apparatus.

2. Description of the Related Art

In the related art, there has been proposed a technology of a camera in which an image stabilization device is attached to an image sensor.

For example, JP2016-131265A describes a technology related to a camera equipped with an image stabilization device in which an image sensor is movable in two directions perpendicular to an optical axis of an imaging optical system.

SUMMARY OF THE INVENTION

An embodiment according to the technology of the present disclosure provides an image stabilization device and an imaging apparatus in which an influence of other magnetic materials on a ball receiving surface is suppressed.

According to a first aspect of the present invention, there is provided an image stabilization device comprising: a movable unit that has an imaging element and a plurality of coils and is supported to be movable in a plane parallel to an imaging surface of the imaging element; a fixed unit that supports the movable unit and has a plurality of magnets, which are disposed to face the plurality of coils, and a yoke; and a ball that is disposed between the movable unit and the fixed unit, in which the movable unit has a ball housing portion configured with a hollow protruding portion that houses the ball, and a ball receiving surface provided at a bottom portion of the ball housing portion is formed of a non-magnetic metal material.

Preferably, the fixed unit is composed of a first yoke and a second yoke provided to be spaced apart from the first yoke, the movable unit is disposed between the first yoke and the second yoke, the plurality of magnets are provided on the second yoke, and the ball housing portion is provided on a second yoke side of the movable unit.

Preferably, the ball housing portion is provided on the movable unit to face the second yoke.

Preferably, the ball housing portion is disposed between the plurality of magnets.

Preferably, the ball housing portion has an elastic member provided on an outer peripheral surface of the hollow protruding portion.

Preferably, the second yoke is provided with an abutting portion that abuts on at least one side surface of the plurality of magnets.

Preferably, the first yoke and the second yoke are connected to each other via a shaft member, the abutting portion is configured with a side surface of a projected shape of the second yoke, and the shaft member is provided on an upper surface of the projected shape.

Preferably, the ball receiving surface has a surface hardness of HV 300 or more.

Preferably, the ball receiving surface has a surface roughness Ra of 0.4 μm or less.

According to another aspect of the present invention, there is provided an imaging apparatus comprising the image stabilization device described above.

Preferably, the imaging apparatus further comprises a processor, in which the processor is configured to: control movement of the movable unit by a drive mechanism configured of a part or an entirety of the plurality of coils and the plurality of magnets, and in a case where the ball receiving surface is formed of a magnetic material, perform the control without applying a resistive force against a magnetic force received from at least one of the plurality of magnets.

DESCRIPTION OF THE PREFERRED EMBODIMENTS

Hereinafter, a preferred embodiment of an image stabilization device and an imaging apparatus according to the present invention will be described with reference to the accompanying drawings.

<Imaging Apparatus>

First, an imaging apparatus equipped with an image stabilization device will be described.

Figure 1:
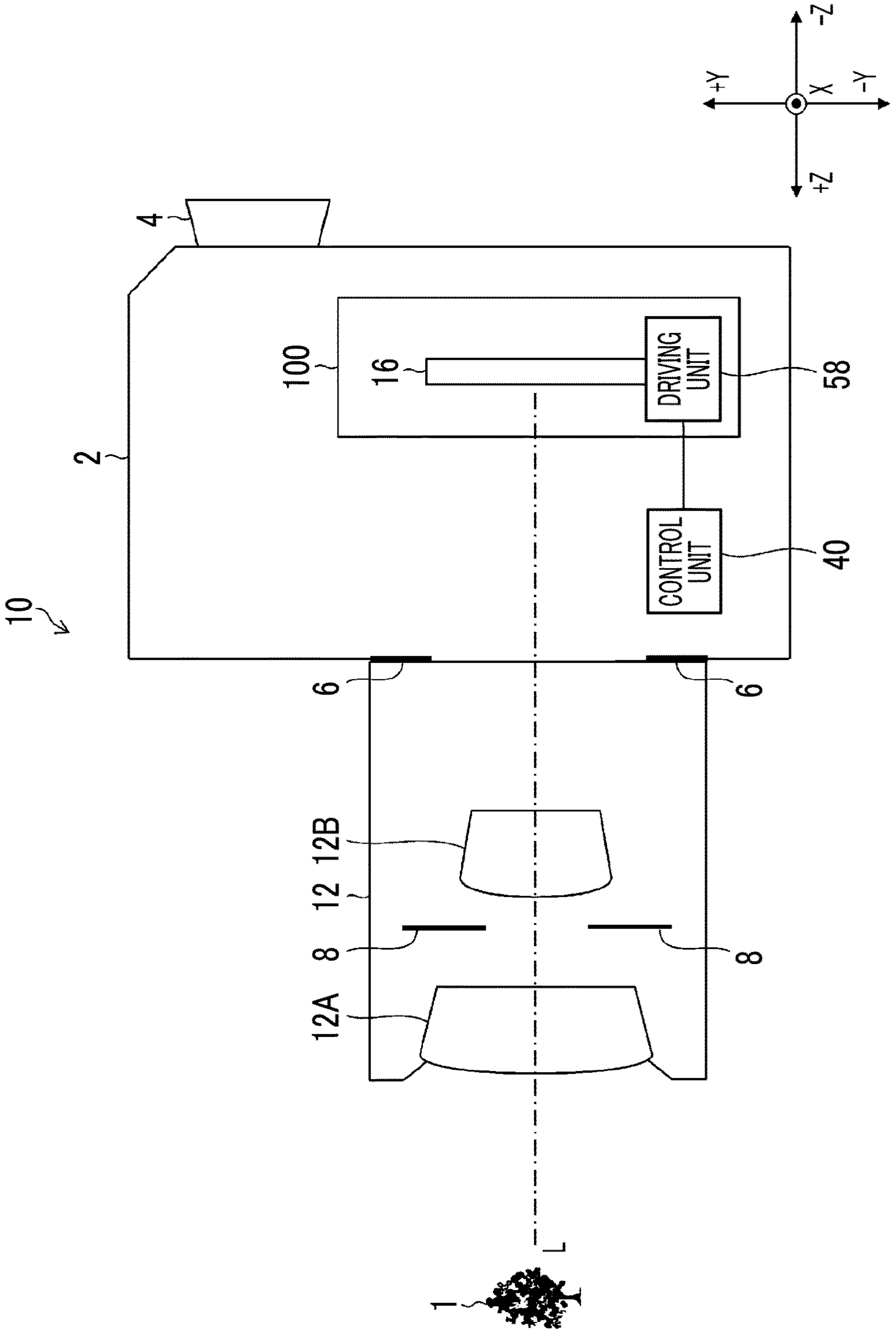
FIG. 1 is a schematic view of an inside of an imaging apparatus equipped with an image stabilization device.

FIG. 1 is a schematic view of an inside of an imaging apparatus equipped with an image stabilization device according to an embodiment of the present invention.

An imaging apparatus 10 is a lens-interchangeable camera, and an imaging lens device 12 is mounted on an imaging apparatus main body 2 via an adapter 6. The imaging lens device 12 comprises a stop 8 and lens groups 12A and 12B. The imaging lens device 12 having an optical axis L forms an image of light reflected by a subject 1. The imaging apparatus main body 2 comprises an eyepiece portion 4, and an imager places his/her eye on the eyepiece portion 4 to image the subject 1 in a case of imaging the subject 1.

On an imaging element 16, a light-receiving surface (imaging surface) is disposed along a plane (X-Y plane) formed by two directions (X direction and Y direction) perpendicular to the optical axis L of the imaging apparatus main body 2. The imaging element 16 is held by an image stabilization device 100. Further, an image stabilization function is realized by a control unit 40 controlling a driving unit 58 included in the image stabilization device 100.

Figure 2:
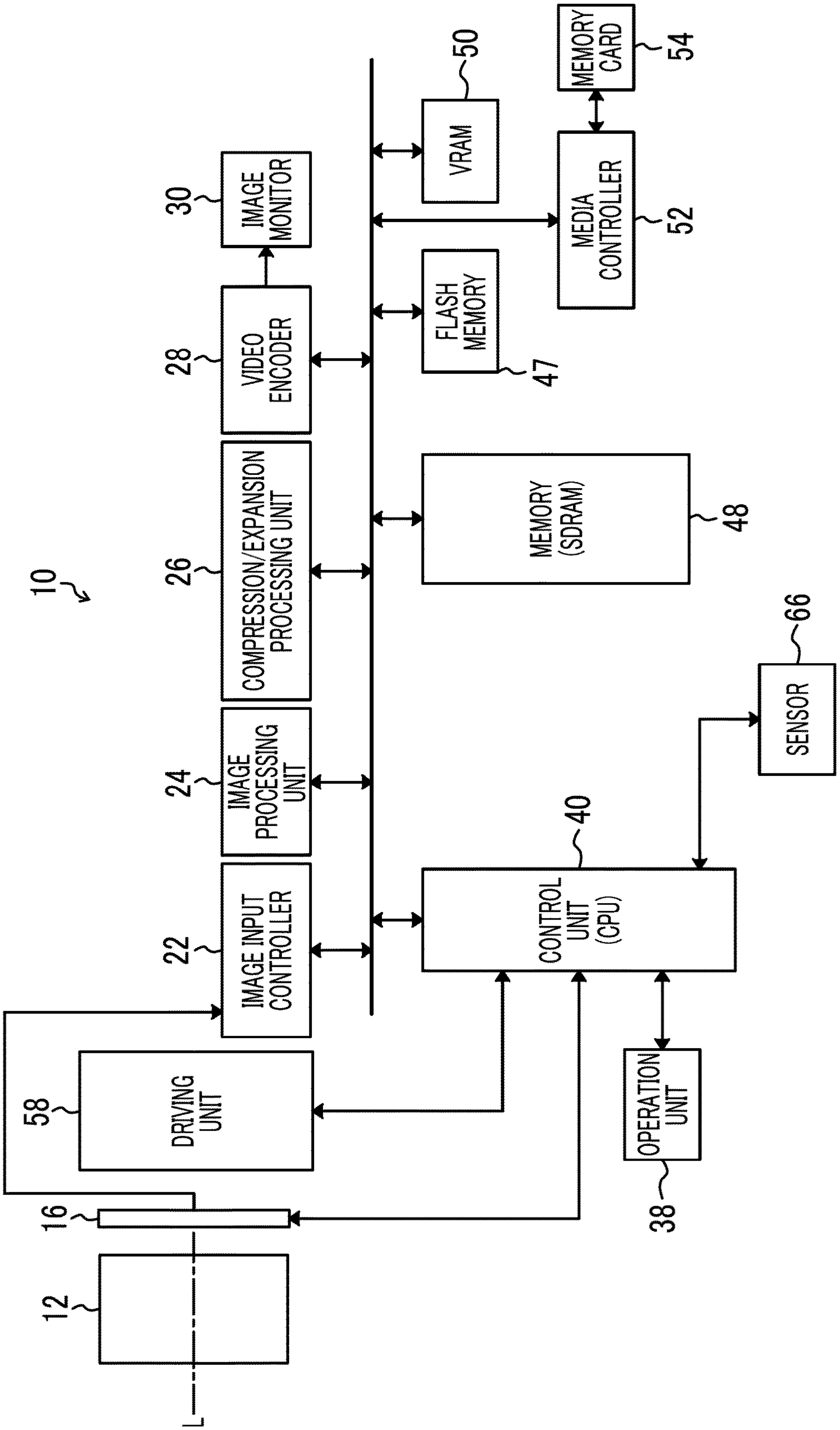
FIG. 2 is a block diagram showing an embodiment of an internal configuration of an imaging apparatus.

FIG. 2 is a block diagram showing an embodiment of an internal configuration of the imaging apparatus 10. The imaging apparatus 10 records a captured image in a memory card 54, and an operation of the entire apparatus is comprehensively controlled by the control unit (central processing unit (CPU)) 40.

The imaging apparatus 10 is provided with an operation unit 38, such as a shutter button, a power/mode switch, a mode dial, and a cross operation button. A signal (command) from the operation unit 38 is input to the control unit 40, and the control unit 40 controls each circuit of the imaging apparatus 10 based on the input signal to perform drive control of the imaging element 16, lens drive control, stop drive control, imaging operation control, image processing control, recording/reproduction control of image data, display control of an image monitor 30, and the like.

A luminous flux that has passed through the imaging lens device 12 is imaged on the imaging element 16 which is a complementary metal-oxide semiconductor (CMOS) type color image sensor. The imaging element 16 is not limited to the CMOS type, and another type of image sensor, such as a charge coupled device (CCD) type or an organic imaging element, may be used.

In the imaging element 16, a large number of light-receiving elements (for example, photodiodes) are two-dimensionally arranged, and a subject image formed on the light-receiving surface of each light-receiving element is converted (photoelectrically converted) into a signal voltage (or charge) of an amount corresponding to an amount of incidence ray, and is converted into a digital signal via an analog/digital (A/D) converter in the imaging element 16 to be output.

An image signal (image data) read from the imaging element 16 in a case of capturing a motion picture or a still picture is temporarily stored in a memory (synchronous dynamic random access memory (SDRAM)) 48 via an image input controller 22.

Further, a flash memory 47 stores various parameters and tables used for a camera control program, image processing, and the like.

A sensor 66 is a camera shake sensor and detects posture information and posture change information of the imaging apparatus 10. The sensor 66 is configured of, for example, a gyro sensor. The sensor 66 is configured of, for example, two gyro sensors to detect a camera shake amount in a vertical direction and a camera shake amount in a horizontal direction, and the detected camera shake amount (angular velocity) is input to the control unit 40. The control unit 40 performs image stabilization by controlling the driving unit 58 to move the imaging element 16 such that the movement of the subject image corresponding to the camera shake is canceled.

The driving unit 58 is controlled by the control unit 40. The driving unit (drive mechanism) 58 is configured with a voice coil motor to be described later.

An image processing unit 24 reads unprocessed image data that is acquired via the image input controller 22 in a case of capturing a motion picture or a still picture and temporarily stored in the memory 48. The image processing unit 24 performs offset processing, pixel interpolation processing (interpolation processing for a phase difference detecting pixel, a defective pixel, and the like), white balance correction, gain control processing including sensitivity correction, gamma-correction processing, synchronization processing (also called "demosaicing"), brightness and color difference signal generation processing, edge enhancement processing, color correction, and the like on the read image data. The image data that is processed by the image processing unit 24 and is processed as a live view image is input to a video random access memory (VRAM) 50.

The image data read from the VRAM 50 is encoded by a video encoder 28 and output to the image monitor 30 provided on a rear surface of the camera. Accordingly, the live view image showing the subject image is displayed on the image monitor 30.

The image data that is processed by the image processing unit 24 and is processed as a still picture or motion picture for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a still picture or a motion picture. The compressed image data is recorded in the memory card 54 via a media controller 52.

Further, the compression/expansion processing unit 26 performs expansion processing on the compressed image data obtained from the memory card 54 via the media controller 52 in a playback mode. The media controller 52 performs recording, reading, or the like of the compressed image data to and from the memory card 54.

In the above embodiment, a hardware structure of a processing unit (control unit 40 or the like) that executes various kinds of processing includes various processors to be described below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured of one of the various processors or may be configured of two or more processors of the same type or different types (for example, a plurality of FPGAs or a combination of a CPU and an FPGA). In addition, a plurality of processing units may be configured of one processor. As an example of configuring the plurality of processing units by one processor, first, there is a form in which one processor is configured of a combination of one or more CPUs and software, as typified by a computer such as a client or a server, and the one processor functions as the plurality of processing units. Second, there is a form in which a processor that realizes functions of an entire system including a plurality of processing units with one integrated circuit (IC) chip is used, as typified by a system on chip (SoC) or the like. As described above, the various processing units are configured using one or more of the above various processors as a hardware structure.

Furthermore, the hardware structure of those various processors is more specifically an electric circuit (circuitry) in which circuit elements such as semiconductor elements are combined.

<Image Stabilization Device>

Next, the image stabilization device 100 will be described.

Figure 3:
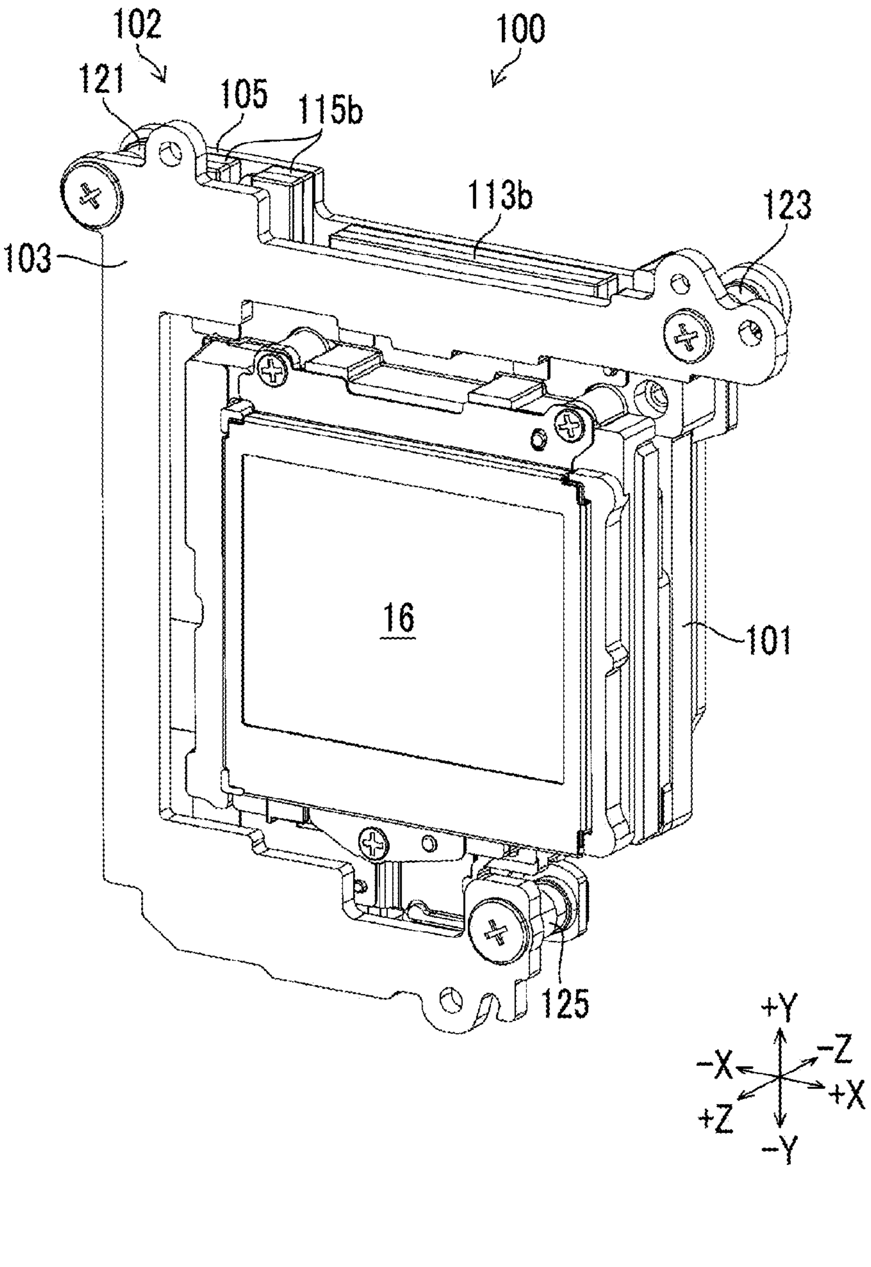
FIG. 3 is a front perspective view of an image stabilization device.
Figure 4:
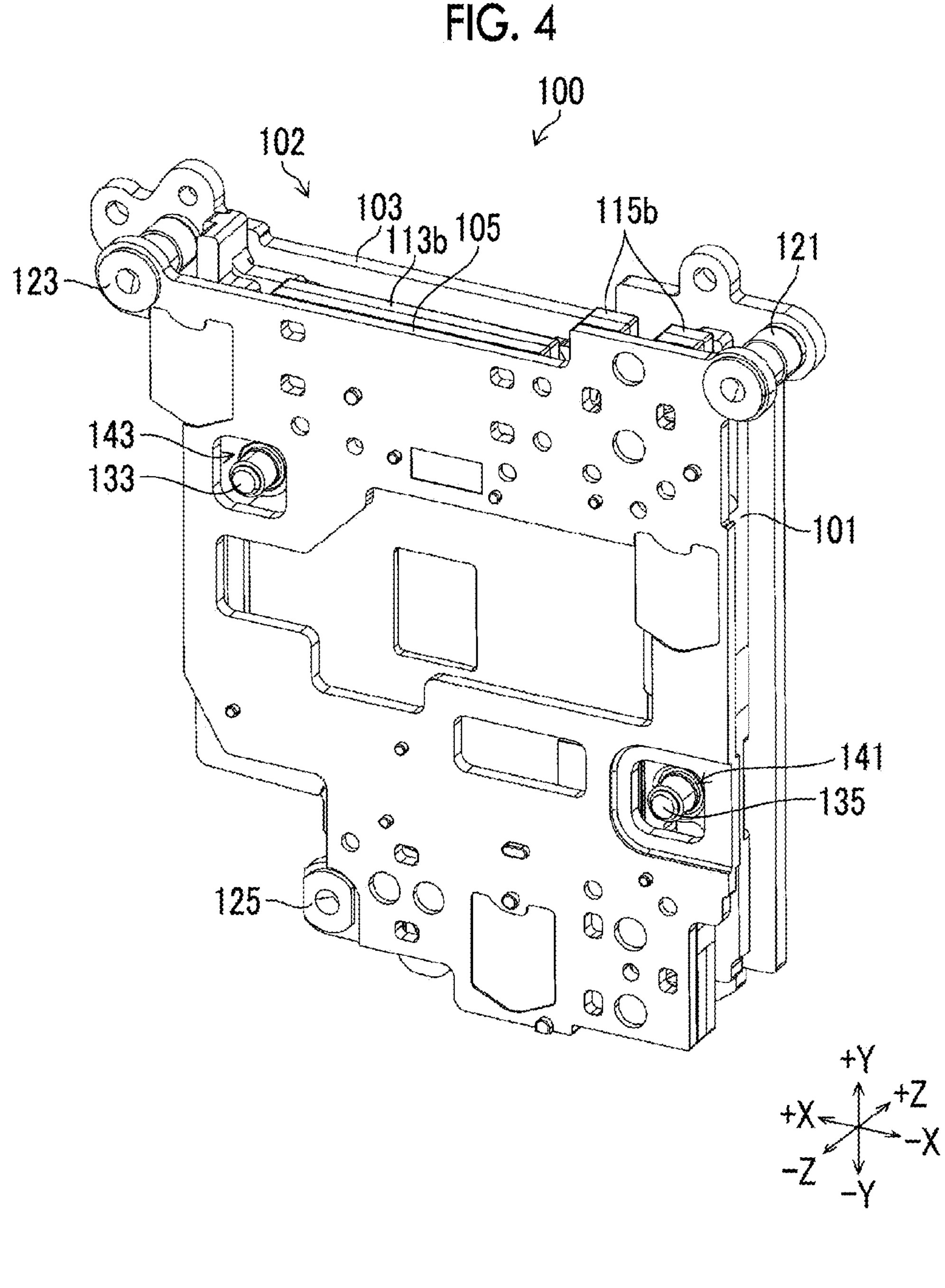
FIG. 4 is a rear perspective view of the image stabilization device.
Figure 5:
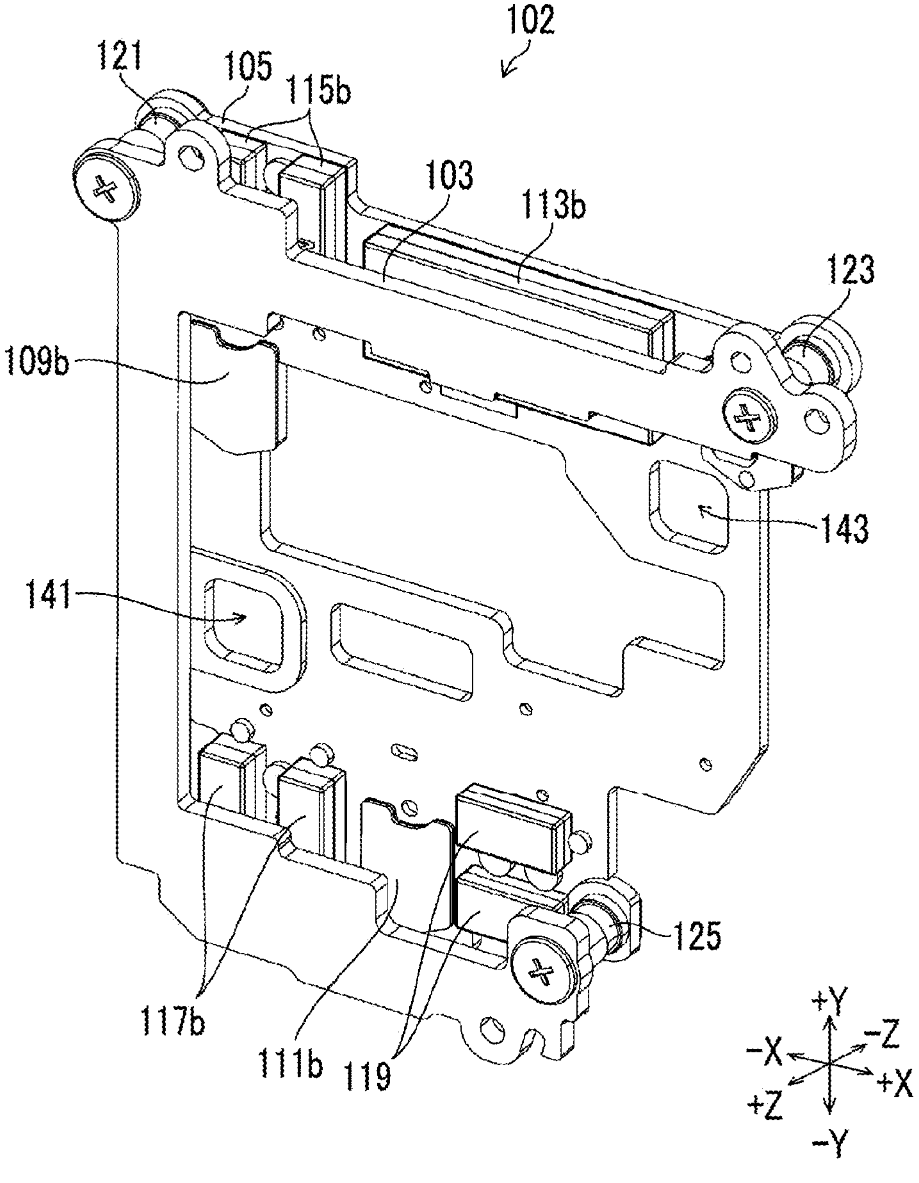
FIG. 5 is a front perspective view of a fixed unit.
Figure 6:
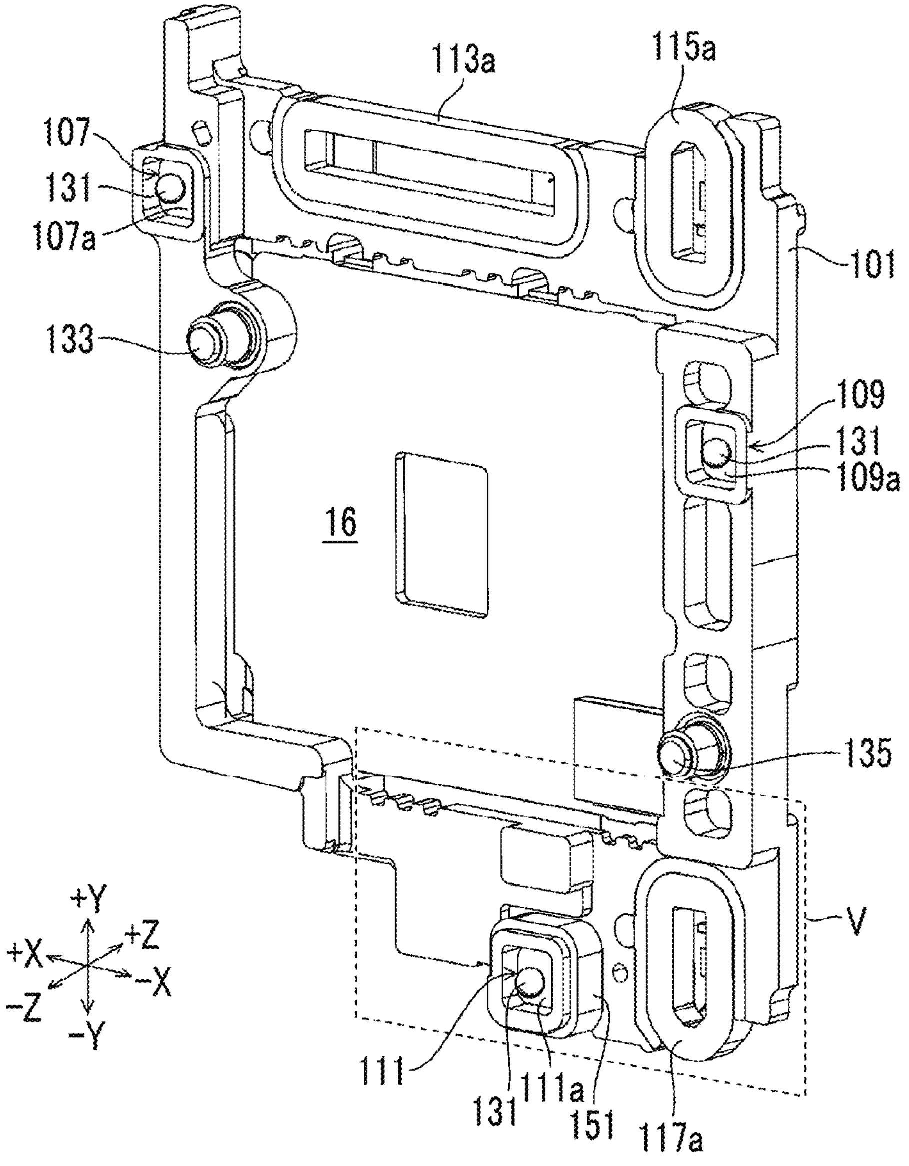
FIG. 6 is a rear perspective view of a movable unit.

FIGS. 3, 4, 5, and 6 are views showing the image stabilization device 100 mounted on the imaging apparatus 10. FIG. 3 is a front perspective view of the image stabilization device 100, FIG. 4 is a rear perspective view of the image stabilization device 100, FIG. 5 is a front perspective view of a fixed unit 102, and FIG. 6 is a rear perspective view of a movable unit 101. In the following description, a front surface is a surface seen from a positive Z-axis side (subject side), and a rear surface is a surface seen from a negative Z-axis side (imager side).

The image stabilization device 100 is mainly composed of the movable unit 101 on which the imaging element 16 is mounted and the fixed unit 102 that is fixed to the imaging apparatus main body 2. The movable unit 101 is in contact with the fixed unit 102 via three balls 131. The movable unit 101 is biased by an attractive force of a magnet (not shown) or an elastic force of a spring with respect to the fixed unit 102 (second yoke 105), and three balls 131 are disposed between the movable unit 101 and the fixed unit 102. In addition, the movable unit 101 can move in a plane (X-Y plane in the drawing) perpendicular to the optical axis L (Z axis in the drawing).

The fixed unit 102 is composed of a first yoke 103 and a second yoke 105. The first yoke 103 is disposed on the subject 1 side, and the second yoke 105 is disposed on the imager side. The fixed unit 102 is fixed to the imaging apparatus main body 2 by a mechanism (not shown).

The first yoke 103 is disposed at a position facing the second yoke 105 in a state of being spaced apart from the second yoke 105 by a shaft 121, a shaft 123, and a shaft 125. The shaft 121, the shaft 123, and the shaft 125 also function as movable end stoppers on the fixed unit 102 side.

The second yoke 105 is disposed to face the first yoke 103 and to be spaced apart from the first yoke 103. The second yoke 105 comprises a magnet 113*b*, a magnet 115*b*, a magnet 117*b*, and a magnet 119. The magnet 113*b* and a coil 113*a* provided in the movable unit 101 constitute a voice coil motor 113. The magnet 115*b* and a coil 115*a* provided in the movable unit 101 constitute a voice coil motor 115. The magnet 117*b* and a coil 117*a* provided in the movable unit 101 constitute a voice coil motor 117. In addition, the magnet 115*b*, the magnet 117*b*, and the magnet 119 are also used as magnets for detecting a Hall element that detects a position of the movable unit 101. In addition, the magnet 113*b* is a dedicated magnet for the voice coil motor 113.

The second yoke 105 has a movable end restricting opening portion 141 and a movable end restricting opening portion 143. A shaft 133 and a shaft 135 of the movable unit 101 are inserted into the movable end restricting opening portion 141 and the movable end restricting opening portion 143. The movable end restricting opening portion 141, the movable end restricting opening portion 143, the shaft 133, and the shaft 135 constitute a movable end restricting portion that restricts a movement range of the movable unit 101.

In a case where the camera shake or the like occurs, the movable unit 101 is driven in a direction in which the camera shake is canceled by the voice coil motor 113, the voice coil motor 117, and the voice coil motor 115. Accordingly, in an image acquired by the imaging element 16 mounted on the movable unit 101, an influence of the camera shake is suppressed. The voice coil motor 113, the voice coil motor 117, and the voice coil motor 115 constitute the driving unit 58.

The movable unit 101 has a ball housing portion 107, a ball housing portion 109, and a ball housing portion 111 on a surface on the second yoke 105 side. Each of the ball housing portion 107, the ball housing portion 109, and the ball housing portion 111 has a shape that houses the ball 131. For example, the ball housing portion 107 and the ball housing portion 109 have a recessed shape, and the ball 131 is housed in the recessed shape. In addition, the ball housing portion 111 has a hollow protruding portion, and the ball 131 is housed in the hollow protruding portion. Each ball 131 housed in the ball housing portion 107, the ball housing portion 109, and the ball housing portion 111 is rollable. Therefore, the movable unit 101 can freely move on a plane (X-Y plane) perpendicular to the optical axis L. The ball housing portion 107, the ball housing portion 109, and the ball housing portion 111 each have a ball receiving surface 107*a*, a ball receiving surface 109*a*, and a ball receiving surface 111*a* at a bottom portion thereof. The second yoke 105 is provided with a ball receiving surface 107*b* (not shown), a ball receiving surface 109*b*, and a ball receiving surface 111*b* on the fixed unit 102 side. In addition, a damper member 151 is provided on an outer peripheral surface of the ball housing portion 111.

<Ball Receiving Surface>

Next, the ball receiving surface 111*a* disposed on the bottom portion of the ball housing portion 111 provided in the movable unit 101 will be described in detail.

Figure 7:
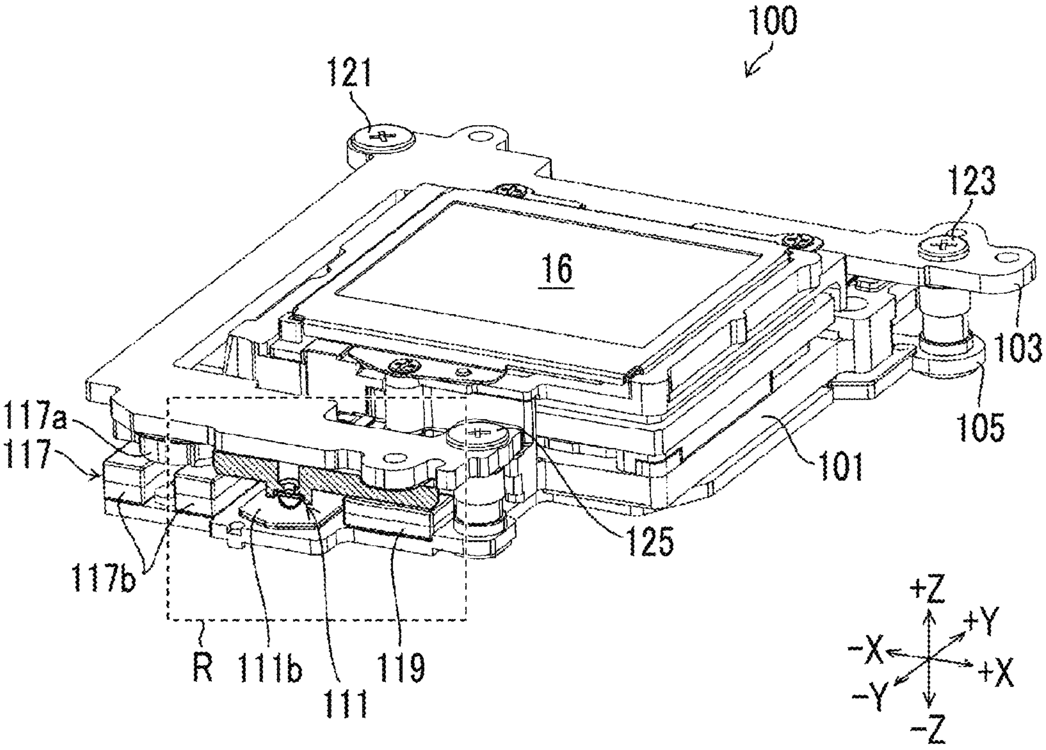
FIG. 7 is a bottom perspective view of the image stabilization device.
Figure 8:
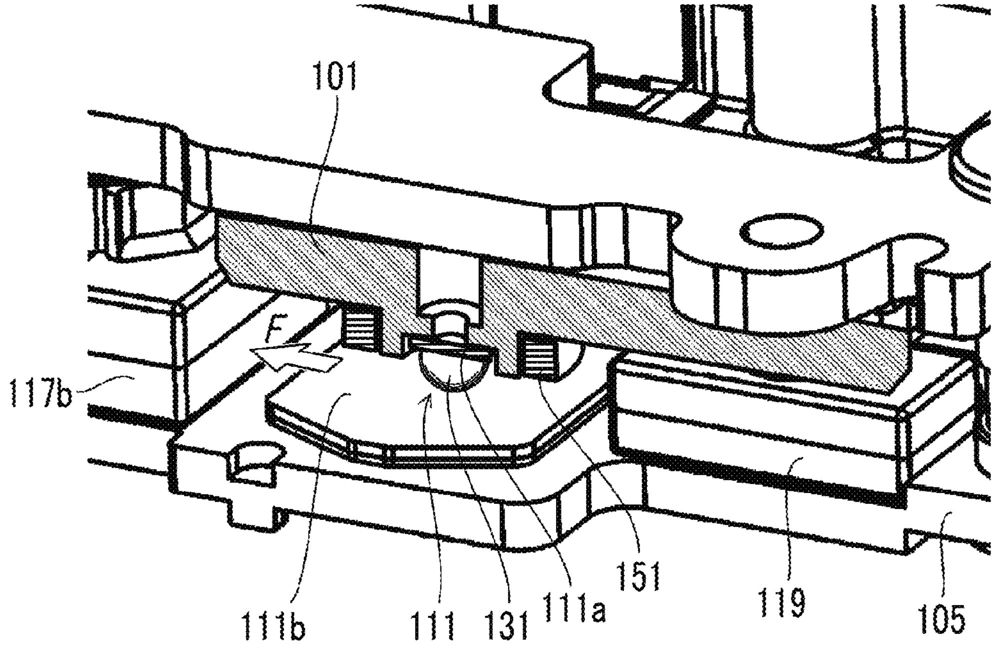
FIG. 8 is an enlarged view of a region R in FIG. 7.

FIGS. 7 and 8 are diagrams for describing the ball housing portion 111. FIG. 7 is a bottom perspective view of the image stabilization device 100, and FIG. 8 is an enlarged view of a region R in FIG. 7.

The ball housing portion 111 is provided to be located between the magnet 117*b* and the magnet 119. In the image stabilization device 100, a space between the ball housing portion 111 and the magnet 117*b* and a space between the ball housing portion 111 and the magnet 119 are narrowed to realize a reduction in size of the image stabilization device 100.

Here, three ball receiving surfaces (107*a*, 109*a*, and 111*a*) provided on the movable unit 101 are required to have high durability because the balls 131 repeatedly roll thereon. In addition, since the movable unit 101 is supported in an optical axis direction by the balls 131, a strong force may act on the ball receiving surface due to a drop impact or vibration, and thus the ball receiving surface is required to have high hardness. Therefore, in the image stabilization device in the related art, ceramics such as zirconia or silicon nitride are used for the ball 131, and the ball receiving surface is formed of a metal material to ensure durability and hardness. In addition, the ball receiving surface of the image stabilization device in the related art is formed of a metal plate having magnetism from the viewpoint of surface hardness and cost.

However, in a case where the space between the ball housing portion 111 and the magnet 117*b* and the space between the ball housing portion 111 and the magnet 119 are narrowed to achieve a reduction in size as in the image stabilization device 100 of the embodiment of the present invention, and a metal plate having magnetism is used for the ball receiving surface 111*a*, the ball housing portion 111 is attracted by the magnetic force of the magnet 117*b* or the magnet 119 (see F in FIG. 8; FIG. 8 shows a case of being attracted to the magnet 117*b*). Specifically, in a case where the voice coil motor 113, the voice coil motor 115, and the voice coil motor 117 are not driven, the ball receiving surface 111*a* is attracted to the magnet 117*b* or the magnet 119. As a result, the movable unit 101 is in a state of being attached to the magnet 117*b* or the magnet 119, and the imaging element 16 mounted on the movable unit 101 is in a tilted state. Since the movable unit 101 can be observed in a case where the imaging lens device 12 is removed from the imaging apparatus main body 2, it is not preferable in appearance in a case where the imaging element 16 is held in a tilted state.

In addition, in a case where the voice coil motor is driven, the movable unit 101 on which the imaging element 16 is mounted is held at the center by a thrust force of the voice coil motor. In a case where the magnet and the ball receiving surface are sufficiently separated from each other in the image stabilization device 100, an attractive force of the magnet for the ball receiving surface is negligibly small, and thus does not cause a problem. However, in a case where the magnet and the ball receiving surface are close to each other, a force that tends to move the movable unit 101 away from the center always acts on the movable unit 101. Therefore, in a case where the ball receiving surface receives an attractive force from the magnet, the movable unit 101 must be held at the center by applying a resistive force against the attractive force, and power consumption in the voice coil motor increases.

In recent years, heat dissipation of an electronic device including the imaging element 16 is often an issue in terms of a reduction in size, and from this viewpoint, it is required to suppress a current flowing in the coil of the voice coil motor.

In the present embodiment, in consideration of the above-described circumstances, the ball receiving surface 111*a* of the image stabilization device 100 is formed of a non-magnetic metal material. As a result, in the image stabilization device 100 according to the embodiment of the present invention, the ball receiving surface 111*a* is not attracted to the magnet, and even in a case where the voice coil motor is not driven, the movable unit 101 is not attached to the magnet, and the appearance is not impaired. In addition, in a case where the ball receiving surface 111*a* is formed of a magnetic material, the imaging apparatus 10 equipped with the image stabilization device 100 can control the movable unit 101 without applying a resistive force against a magnetic force received from the magnet, and thus it is possible to suppress power consumption of the voice coil motor.

Next, selection of a material of the ball receiving surface 111*a* in the image stabilization device 100 according to the embodiment of the present invention will be described.

Figure 9:
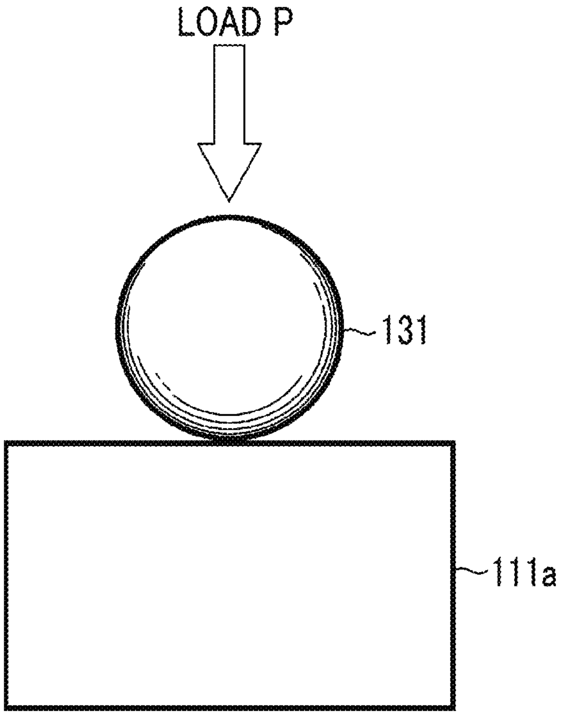
FIG. 9 is a diagram illustrating a load applied to a ball receiving surface.

FIG. 9 is a diagram illustrating a load P applied to the ball receiving surface 111*a* by the ball 131.

In a case of selecting the material of the ball receiving surface 111*a*, it is necessary to perform a design under a condition that a dent does not occur in the ball receiving surface 111*a* due to a concentrated load of the ball 131 as shown below.

That is, a yield stress ($\sigma_y$) of the ball receiving surface 111*a* needs to be larger than a concentrated load $P_{max}$ ($\sigma_y$ (yield stress)>$P_{max}$). $P_{max}$ is calculated by Equation (1), $P_0$ of $P_{max}$ is calculated by Equation (2), and a of $P_0$ is calculated by Equation (3).

$$P_{max} = 0.3P_0 \tag{1}$$

$$P_0 = \frac{3P}{2\pi a^2} \tag{2}$$

$$a = \sqrt[3]{\frac{\frac{3P}{4}\left(\frac{1-v_1^2}{E_1} + \frac{1-v_2^2}{E_2}\right)}{\left(\frac{1}{R_1} + \frac{1}{R_2}\right)}} \tag{3}$$

In addition, the following values are used in Equations (1) to (3) described above. In addition, in Equation (3) described above, $v_1$, $E_1$, and $R_1$ indicate respective values of the ball 131, and $v_2$, $E_2$, and $R_2$ indicate respective values of the ball receiving surface 111*a*. Since the ball receiving surface 111*a* is a flat surface in the present example, $R_2=\infty$.

P [N] Concentrated load
v [-] Poisson's ratio
E [MPa] Longitudinal elastic modulus
R [mm] Radius of curvature (co in case of flat surface)
a [mm] Contact radius
$\sigma_y$ [MPa] Yield stress The surface of the ball receiving surface 111*a* that comes into contact with the ball 131 needs to be smooth (surface roughness Ra is 0.4 μm or less). In a case where the ball receiving surface 111*a* has irregularities such as dents, a fluctuation in driving force occurs in a case where the ball 131 passes through, and it is difficult to perform the drive control.

On the other hand, by increasing a radius of the ball 131 from Equations (1) to (3) described above, a stress on the ball receiving surface 111*a* can be reduced, and the occurrence of dents on the ball receiving surface 111*a* can be suppressed. However, increasing the radius of the ball 131 is not a good measure because it directly leads to an increase in size of the image stabilization device 100.

In a case where both a hardness of the ball receiving surface 111*a* and a hardness of the ball 131 can be increased, it is possible to suppress the occurrence of dents on the ball receiving surface 111*a* while maintaining the radius of the ball 131.

Therefore, a surface hardness of the ball receiving surface 111*a* is preferably HV 300 or more. In addition, the surface roughness Ra of the ball receiving surface 111*a* is preferably 0.4 μm or less.

Figure 10:
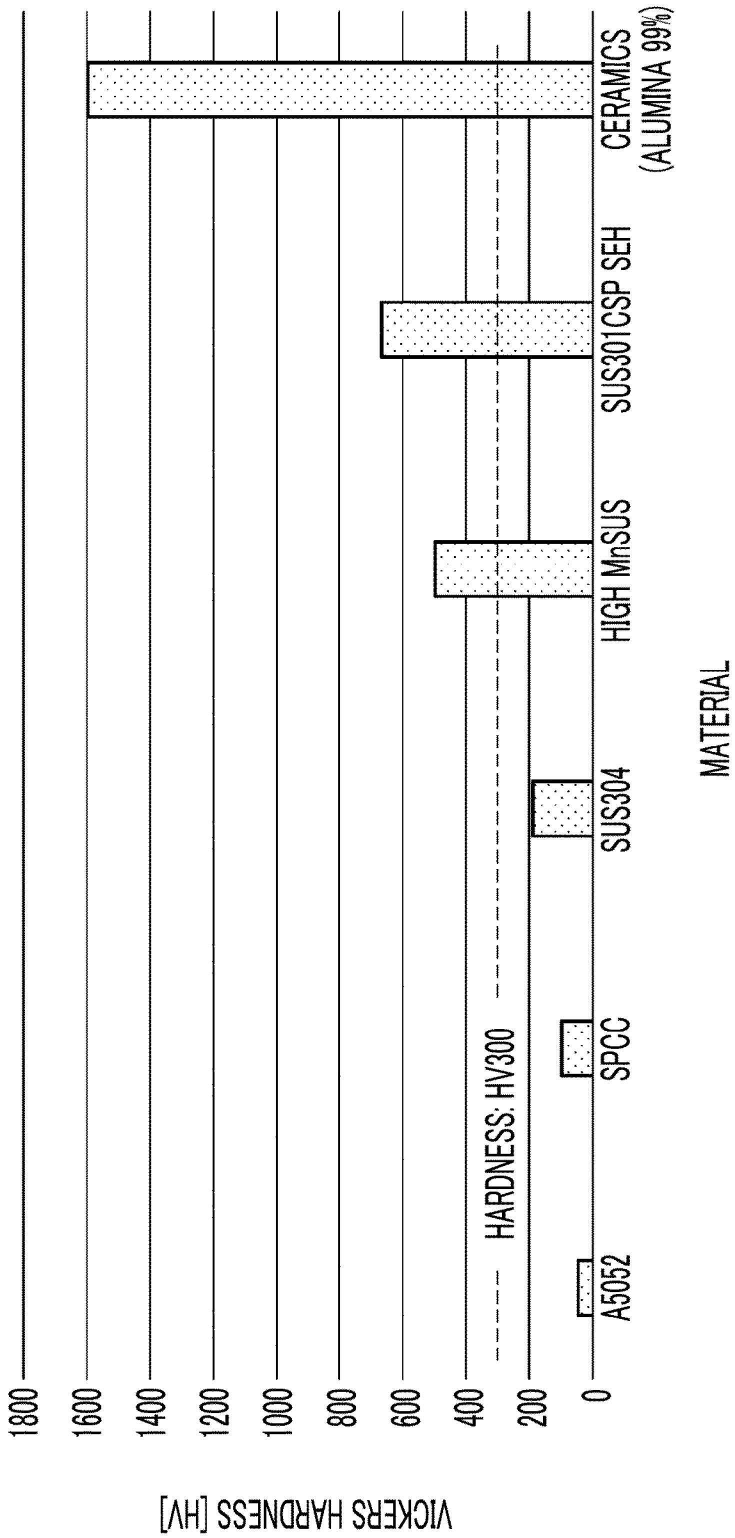
FIG. 10 is a graph showing a Vickers hardness (HV).

FIG. 10 is a diagram showing a Vickers hardness (HV) of a material that can be used for the ball receiving surface 111*a*. FIG. 10 shows the surface hardness of "material symbol A5052 (aluminum alloy)", "material symbol SPCC (Steel Plate Cold Commercial) (cold-rolled steel plate)", "material symbol SUS (Steel Use Stainless) 304 (stainless steel)", "high manganese stainless steel (denoted as high MnSUS in the drawing)", "material symbol SUS (Steel Use Stainless) 301CSP SEH", and "ceramics (alumina 99%)".

As shown in FIG. 10, materials such as SUS304 and A5052, which are non-magnetic materials, have a hardness lower than HV 300, and the hardness is not sufficient as the material of the ball receiving surface 111*a*. On the other hand, ceramics are non-magnetic, have high hardness, and are suitable as the material of the ball receiving surface 111*a*. However, it is difficult to process the ceramics into a smooth surface for use in the ball receiving surface 111*a*, which increases a cost of a component.

Therefore, high manganese stainless steel (high MnSUS) is suitably used for the ball receiving surface 111*a* of the present embodiment. By using high manganese stainless steel, which is a non-magnetic material, for the ball receiving surface 111*a*, it is possible to provide the image stabilization device 100 having reliability in which the ball housing portion 111 is prevented from being attracted to the magnet 117*b* or 119 and the occurrence of dents on the ball receiving surface 111*a* is suppressed. In addition, since high manganese stainless steel has corrosion resistance without a surface treatment, the surface treatment such as coating and plating is not necessary, and durability can be guaranteed by a strength of a base material.

As described above, since the ball receiving surface 111*a* of the image stabilization device 100 according to the embodiment of the present invention is formed of a non-magnetic material, the ball receiving surface 111*a* is not attracted to the magnet to make it possible to maintain a favorable appearance, and the power to the voice coil motor can be saved. In the above description, the ball receiving surface 111*a* of the ball housing portion 111 has been described. Similarly, a non-magnetic member can also be used for the ball receiving surfaces (the ball receiving surface 107*a* and the ball receiving surface 109*a*) of the other ball housing portions (the ball housing portion 107 and the ball housing portion 109).

<Damper Member>

Next, the damper member 151 of the ball housing portion 111 will be described.

Figure 11:
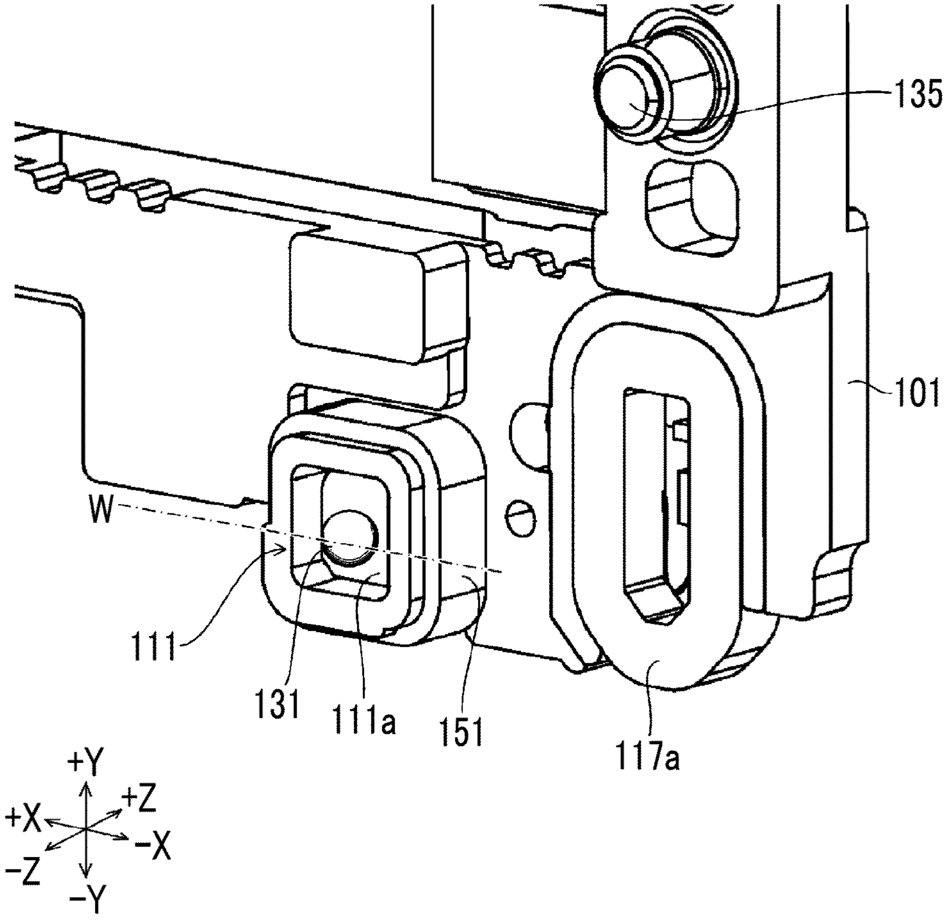
FIG. 11 is an enlarged view of a vicinity (region V in FIG. 6) of a damper member.

FIG. 11 is an enlarged view of the vicinity (region V in FIG. 6) of the damper member 151 provided in the ball housing portion 111 of the movable unit 101.

The damper member 151 is composed of an elastic member such as rubber. The damper member 151 is provided in a state of being wound in a ring shape on the outer peripheral surface of the hollow protruding portion of the ball housing portion 111. The ball housing portion 111 collides with the magnet 117*b* or the magnet 119 disposed nearby due to the movement of the movable unit 101. Therefore, in order to mitigate an impact caused by the collision, the damper member 151 is provided on the outer peripheral surface of the hollow protruding portion of the ball housing portion 111.

Since the movable unit 101 can freely move on the X-Y plane, the movable unit 101 can rotate about an axis parallel to the optical axis L as a rotation axis. The rotation of the movable unit 101 is restricted by the shafts 133 and 135 that function as movable end stoppers. However, the outermost peripheral portion of the movable unit 101 can be moved in a larger range than a range of translational movement in the X-Y plane. Therefore, components near the image stabilization device 100 that are provided inside the imaging apparatus main body 2 need to be disposed at a location farther from the optical axis L in order to avoid interference with the movable unit 101, and this may cause an increase in size of the imaging apparatus main body 2.

Therefore, in the present embodiment, the rotation of the movable unit 101 is restricted by causing the damper member 151 to collide with the magnet 117*b* or the magnet 119.

Figure 12:
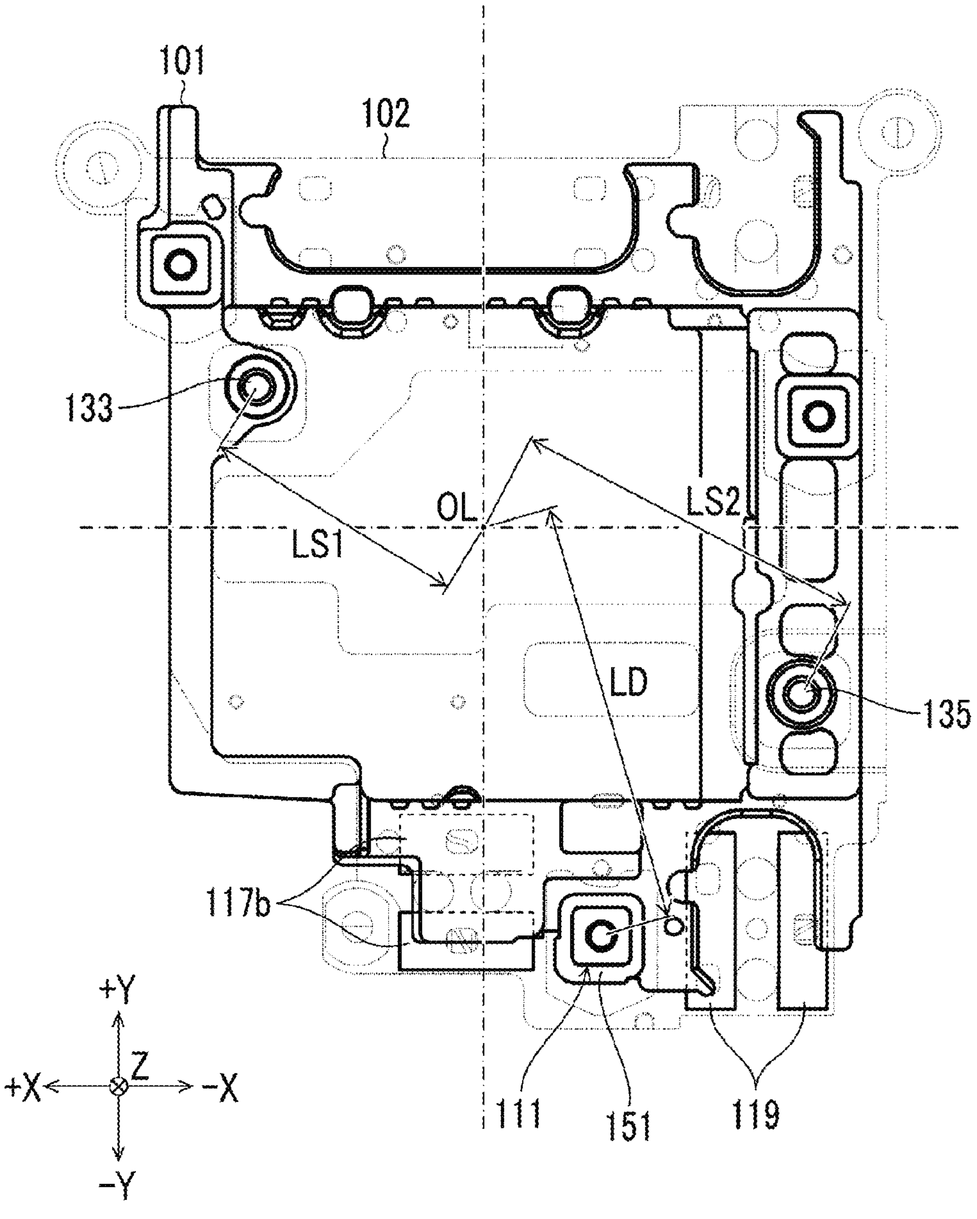
FIG. 12 is a diagram illustrating movement of the movable unit.
Figure 13:
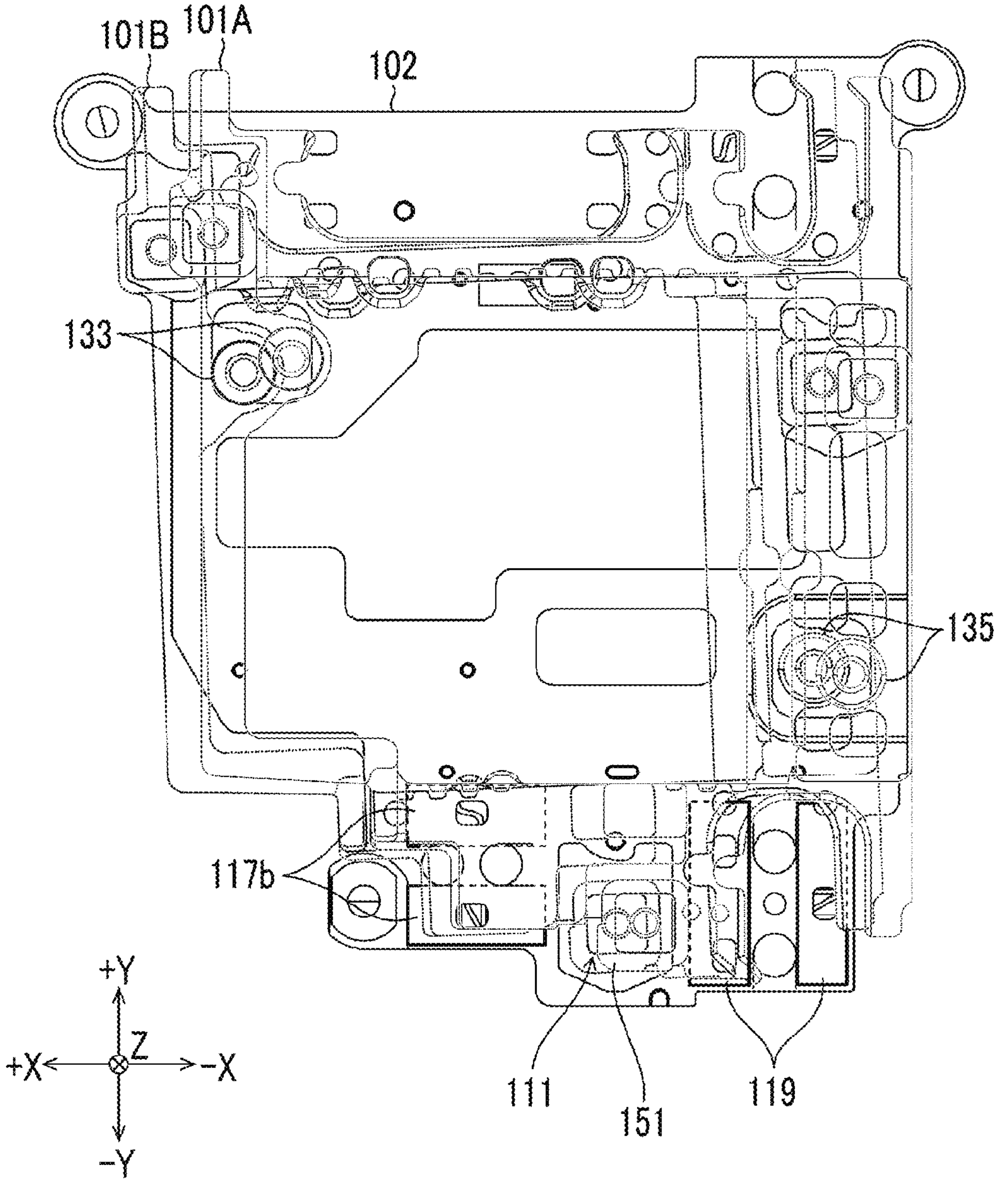
FIG. 13 is a diagram illustrating the movement of the movable unit.

FIGS. 12 and 13 are diagrams illustrating the movement of the movable unit 101 restricted by the damper member 151. FIG. 12 is a diagram showing a case where the movable unit 101 is positioned at a central position, and FIG. 13 is a diagram illustrating restriction of rotational movement of the movable unit 101 by the damper member 151.

As shown in FIG. 12, a distance LS1 from an optical axis center OL to the shaft 133 is shorter than a distance LD from the optical axis center OL to the ball housing portion 111. In addition, a distance LS2 from the optical axis center OL to the shaft 135 is shorter than the distance LD from the optical axis center OL to the ball housing portion 111. That is, the damper member 151 is disposed outside the optical axis center OL with respect to the shafts 133 and 135.

In FIG. 13, a position of the movable unit 101 that is translationally moved in a negative X-axis direction is indicated by a reference numeral 101A, and a position of the movable unit 101 that is rotated counterclockwise toward the drawing is indicated by a reference numeral 101B. In a case where the movable unit 101 is translationally moved in the negative X-axis direction, the shaft 133 or the shaft 135 functions as a movement restricting member, and the movement of the movable unit 101 is restricted. On the other hand, in a case where the movable unit 101 is rotated counterclockwise, the damper member 151 collides with the magnet 119 to restrict the rotation of the movable unit 101 before the shafts 133 and 135 function as the movement restricting members. Therefore, by colliding the damper member 151 with the magnet 119 to restrict the rotation of the movable unit 101, a movable amount during rotation can be restricted without reducing a movable stroke of the movable unit 101 in a translational direction. In the above description, a case where the damper member 151 collides with the magnet 119 in a case where the movable unit 101 rotates counterclockwise has been described. Similarly, the rotation of the movable unit 101 is also restricted by the damper member 151 in a case where the movable unit 101 rotates clockwise. In this case, the damper member 151 collides with the magnet 117*b*, and thus the rotation of the movable unit 101 is restricted.

Figure 14:
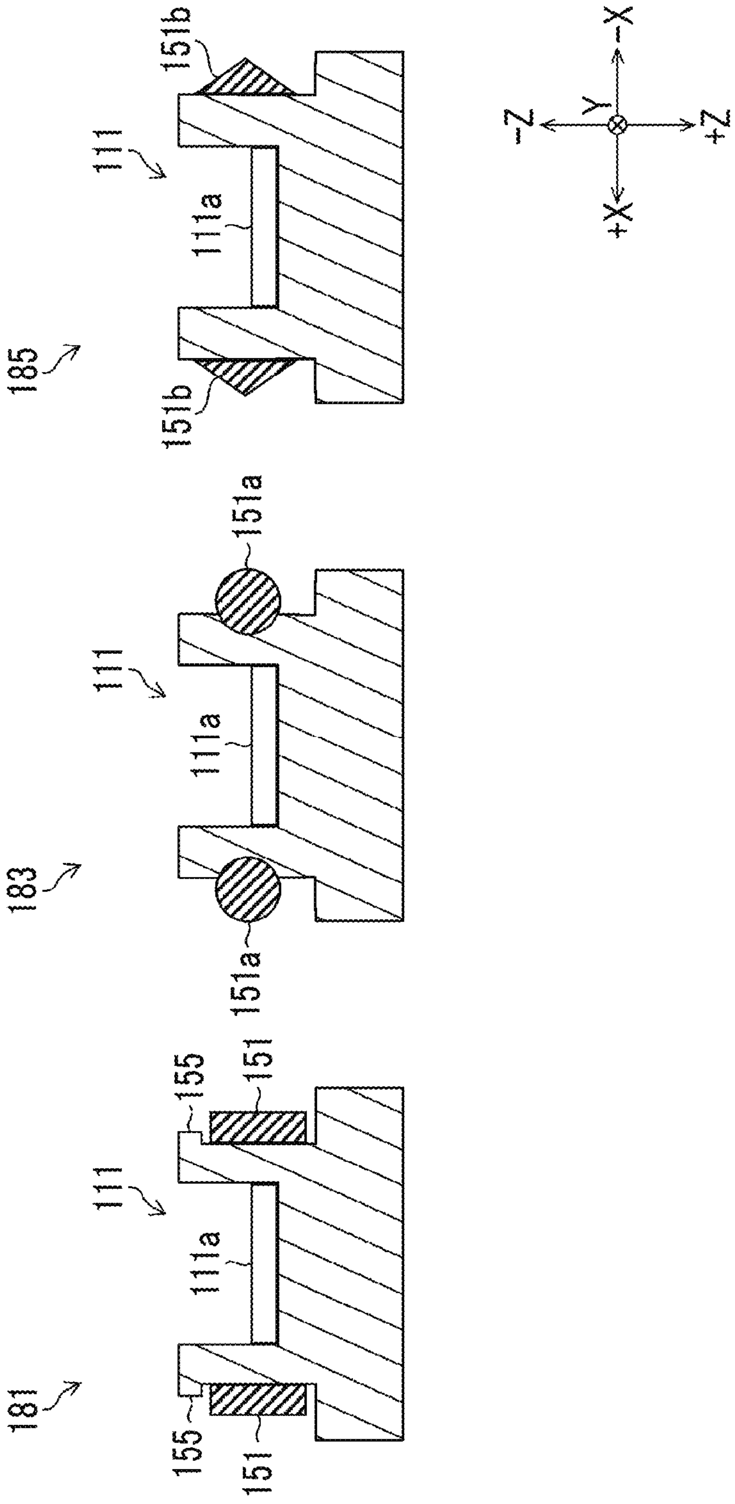
FIG. 14 shows a cross section of a location indicated by W in FIG. 11.

FIG. 14 is a diagram showing cross sections of the ball housing portion 111 and the damper member 151. FIG. 14 shows a cross section of a location indicated by W in FIG. 11.

A reference numeral 181 shows a modification example of the ball housing portion 111. Since the damper member 151 is subjected to repeated forces by colliding with the magnet 117*b* or the magnet 119, it is preferable to provide a protrusion shape 155 having an outer diameter larger than an inner diameter of the damper member 151 to prevent the damper member 151 from falling out of the ball housing portion 111. Accordingly, the damper member 151 can be prevented from falling out of the ball housing portion 111.

Reference numerals 183 and 185 show modification examples of the damper member 151. The cross section of the damper member 151 may be rectangular as shown in the example of the reference numeral 181, or may be circular as shown in the example of the reference numeral 183. In addition, the cross section of the damper member 151 may have a triangular shape as shown in the example of the reference numeral 185.

In the above description, the example in which the damper member 151 is provided on the outer peripheral surface of the ball housing portion 111 has been described, but the present invention is not limited to this example. For example, the damper member 151 may be provided in the ball housing portion 107 or the ball housing portion 109.

<Holding Structure of Magnet>

Next, a holding structure of the magnet 119 in the second yoke 105 will be described.

As described above, the magnet 119 has a function of colliding with the damper member 151 to restrict the movement of the movable unit 101. Therefore, a force parallel to a movable direction of the movable unit 101 is applied from the damper member 151 due to the collision. Since this force becomes large in a case where an impact is applied to the camera upon being dropped or the like, it is often insufficient to fix the magnet 119 to the second yoke 105 with an adhesive. Therefore, in the image stabilization device 100 of the present embodiment, an abutting portion with a side surface of the magnet 119 is provided in the second yoke 105 to suppress a displacement of the magnet 119 due to an impact force from the damper member 151.

Figure 15:
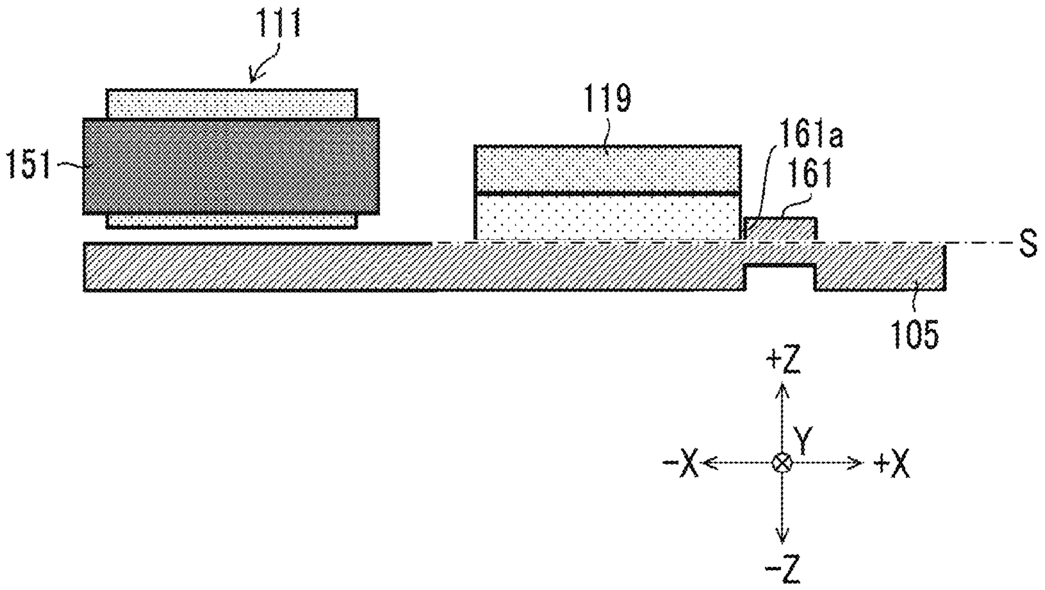
FIG. 15 is a diagram illustrating an abutting portion.

FIG. 15 is a diagram illustrating the abutting portion provided in the second yoke 105.

FIG. 15 shows an example in which an abutting portion 161*a* of a projected portion 161 is provided in the second yoke 105. A part of the second yoke 105 is formed into the projected portion 161 to form the abutting portion 161*a* that abuts on the side surface of the magnet 119. The projected portion 161 is provided on a side of the magnet 119 opposite to a side where the damper member 151 is located, so as to dispose the magnet 119 together with the damper member 151. In addition, the projected portion 161 forms a projected shape to the magnet 119 side (a positive X direction in the drawing) with respect to a contact surface S between a bottom surface of the magnet 119 and the second yoke 105.

As described above, by forming the projected portion 161 on the second yoke 105 and providing the abutting portion 161*a*, the magnet 119 can be appropriately held even in a case where the movable unit 101 moves so that the damper member 151 collides with the magnet 119, and an impact force is applied to the magnet 119.

Figure 16:
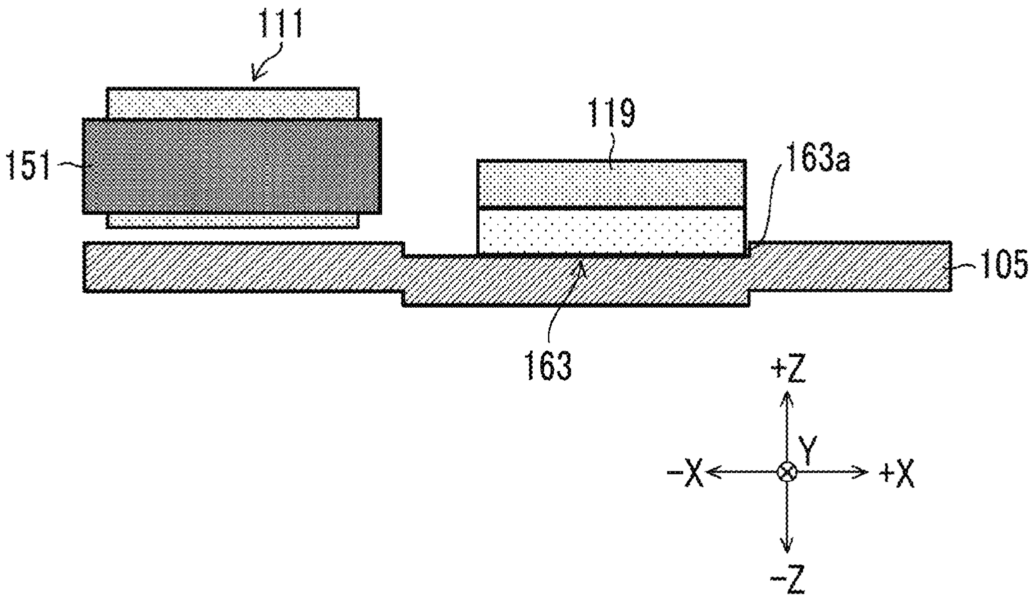
FIG. 16 is a diagram illustrating another example of the abutting portion.

FIG. 16 is a diagram illustrating another example of the abutting portion provided in the second yoke 105.

FIG. 16 shows an example in which an abutting portion 163*a* of a recessed portion 163 is provided in the second yoke 105. A part of the second yoke 105 is formed into the recessed portion 163 to form the abutting portion 163*a* that abuts on the side surface of the magnet 119. In this manner, even in a case where the recessed portion 163 is formed in a part of the second yoke 105 to provide the abutting portion 163*a*, the magnet 119 can be appropriately held.

Figure 17:
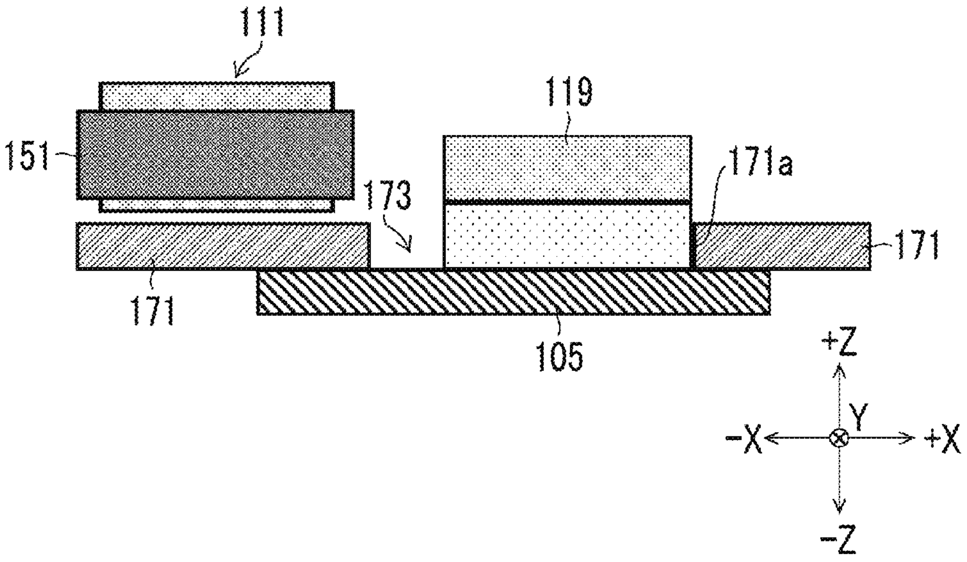
FIG. 17 is a diagram illustrating further another example of the abutting portion.

FIG. 17 is a diagram illustrating still another example of the abutting portion.

In FIG. 17, a hole 173 is provided in a member 171 different from the second yoke 105, and a side surface of the hole 173 forms an abutting portion 171*a*. The second yoke 105 and the member 171 are connected to each other so as not to move relative to each other. In addition, it is preferable that the member 171 is made of a material having a lower magnetic permeability than the second yoke 105. In this manner, even in a case where the hole 173 is provided in the member 171 different from the second yoke 105, and the side surface of the hole 173 serves as the abutting portion 171*a*, the magnet 119 can be appropriately held.

In the above description, the example described above, holding of the magnet 119 has been described, but the present invention is not limited thereto. The above-described holding mechanism can be adopted in other magnets (the magnet 113*b*, the magnet 115*b*, and the magnet 117*b*) held by the image stabilization device 100.

Figure 18:
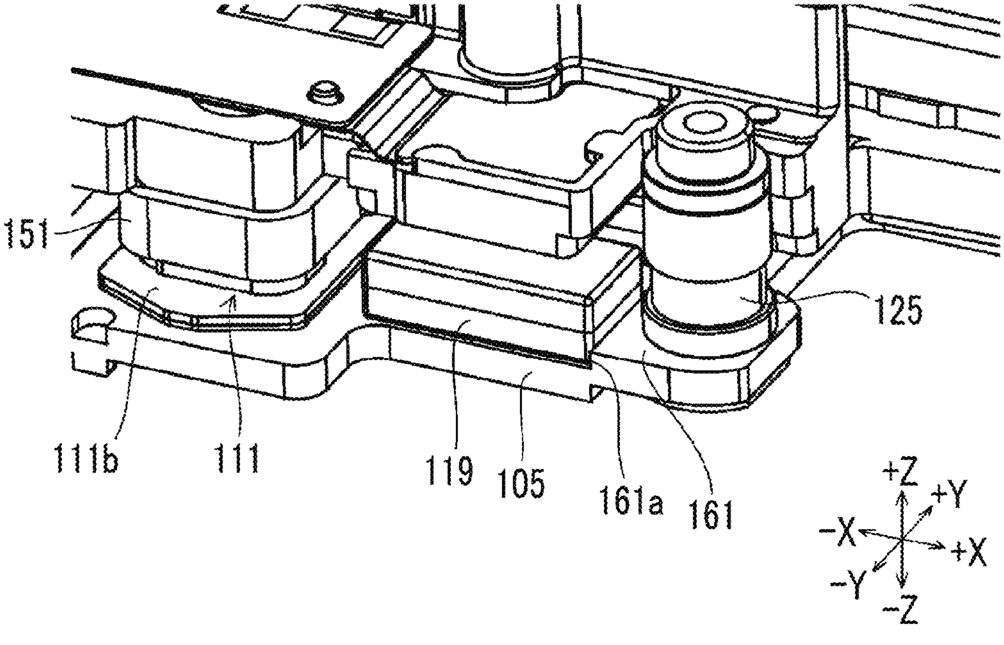
FIG. 18 is a diagram illustrating an example in which a shaft is provided in a projected portion.

FIG. 18 is a diagram illustrating an example in which the shaft (shaft member) 125 is provided on an upper surface of the projected portion 161 described in FIG. 15.

The projected portion 161 that forms the abutting portion 161*a* for holding the magnet 119 needs to be disposed on a side opposite to the damper member 151 with the magnet 119 interposed therebetween. Therefore, there is a limitation on a location where the projected portion 161 is disposed. In addition, in order to increase the thrust force of the voice coil motor, it is necessary to dispose the facing yoke (first yoke 103) at a position facing the magnet 113*b* with the coil 113*a* interposed therebetween, a position facing the magnet 115*b* with the coil 115*a* interposed therebetween, and a position facing the magnet 117*b* with the coil 117*a* interposed therebetween, and it is necessary to dispose the shaft 125 for connecting the facing yoke (first yoke 103) and the second yoke 105. The shaft 125 is fixed to the second yoke 105 by screw fastening or caulking. In addition, by providing a fixing position of the shaft 125 on the upper surface of the projected portion 161, it is possible to achieve space saving as compared with a case where the fixing position of the shaft 125 is separately provided. In this case, a distance from an attachment position of the shaft 125 to the first yoke 103 is shortened by a height of the projected portion 161. Therefore, the shaft 125 is designed to be shorter than other shafts (the shaft 121 and the shaft 123), so that the first yoke 103 and the second yoke 105 are attached in parallel.

Although examples of the present invention have been described above, it goes without saying that the present invention is not limited to the above-described embodiment, and various modifications can be made without departing from the scope of the present invention.

EXPLANATION OF REFERENCES

1: subject
2: imaging apparatus main body
10: imaging apparatus
12: imaging lens device
16: imaging element
40: control unit
58: driving unit
100: image stabilization device
101: movable unit
102: fixed unit
103: first yoke
105: second yoke
107: ball housing portion
109: ball housing portion
111: ball housing portion
121: shaft
123: shaft
125: shaft
131: ball
133: shaft
135: shaft
141: movable end restricting opening portion
143: movable end restricting opening portion
151: damper member

What is claimed is:

1. An image stabilization device comprising:

a movable unit that has an imaging element and a plurality of coils and is supported to be movable in a plane parallel to an imaging surface of the imaging element;

a fixed unit that supports the movable unit and has a plurality of magnets, which are disposed to face the plurality of coils, and a yoke; and a ball that is disposed between the movable unit and the fixed unit, wherein the movable unit has a ball housing portion configured with a hollow protruding portion that houses the ball, and a ball receiving surface provided at a bottom portion of the ball housing portion is formed of a non-magnetic metal material, and the ball housing portion has an elastic member provided on an outer peripheral surface of the hollow protruding portion.

2. The image stabilization device according to claim 1, wherein the fixed unit is composed of a first yoke and a second yoke provided to be spaced apart from the first yoke, the movable unit is disposed between the first yoke and the second yoke, the plurality of magnets are provided on the second yoke, and the ball housing portion is provided on a second yoke side of the movable unit.

3. The image stabilization device according to claim 2, wherein the ball housing portion is provided on the movable unit to face the second yoke.

4. The image stabilization device according to claim 1, wherein the ball housing portion is disposed between the plurality of magnets.

5. The image stabilization device according to claim 1, wherein the ball receiving surface has a surface hardness of HV 300 or more.

6. The image stabilization device according to claim 1, wherein the ball receiving surface has a surface roughness Ra of 0.4 μm or less.

7. An imaging apparatus comprising the image stabilization device according to claim 1.

8. The imaging apparatus according to claim 7, further comprising a processor, wherein the processor is configured to:

control movement of the movable unit by a drive mechanism configured of a part or an entirety of the plurality of coils and the plurality of magnets, and in a case where the ball receiving surface is formed of a magnetic material, perform the control without applying a resistive force against a magnetic force received from at least one of the plurality of magnets.

9. An image stabilization device comprising:

a movable unit that has an imaging element and a plurality of coils and is supported to be movable in a plane parallel to an imaging surface of the imaging element;

a fixed unit that supports the movable unit and has a plurality of magnets, which are disposed to face the plurality of coils, and a yoke; and a ball that is disposed between the movable unit and the fixed unit, wherein the movable unit has a ball housing portion configured with a hollow protruding portion that houses the ball, and a ball receiving surface provided at a bottom portion of the ball housing portion is formed of a non-magnetic metal material, the fixed unit is composed of a first yoke and a second yoke provided to be spaced apart from the first yoke, the movable unit is disposed between the first yoke and the second yoke, the plurality of magnets are provided on the second yoke, the ball housing portion is provided on a second yoke side of the movable unit, the second yoke is provided with an abutting portion that abuts on at least one side surface of the plurality of magnets, and the abutting portion is configured with a side surface of a projected shape of the second yoke.

10. The image stabilization device according to claim 9 wherein the first yoke and the second yoke are connected to each other via a shaft member, and the shaft member is provided on an upper surface of the projected shape.

11. An imaging apparatus comprising the image stabilization device according to claim 9.

12. The imaging apparatus according to claim 11, further comprising a processor, wherein the processor is configured to:

control movement of the movable unit by a drive mechanism configured of a part or an entirety of the plurality of coils and the plurality of magnets, and in a case where the ball receiving surface is formed of a magnetic material, perform the control without applying a resistive force against a magnetic force received from at least one of the plurality of magnets.

* * * * *